United States Patent
Lang et al.

[15] 3,698,679
[45] Oct. 17, 1972

[54] SEMI-AUTOMATIC RESTRAINT MECHANISM

[72] Inventors: John M. Lang, Bellevue; Robert D. Trautman, Seattle, both of Wash.

[73] Assignee: The Boeing Company, Seattle, Wash.

[22] Filed: Dec. 11, 1970

[21] Appl. No.: 97,240

[52] U.S. Cl. ............248/361 R, 105/366 C, 104/249
[51] Int. Cl. .............................................B61d 45/00
[58] Field of Search....248/361 R, 119 R; 105/366 C; 104/172 B, 172 S, 249, 162; 244/137 R, 118 R

[56] References Cited

UNITED STATES PATENTS

| | | | |
|---|---|---|---|
| 1,768,486 | 6/1930 | Ogden | 104/172 B |
| 2,863,399 | 12/1958 | Howard | 104/162 X |
| 3,195,474 | 7/1965 | Dehne | 104/172 |
| 3,210,038 | 10/1965 | Bader | 248/361 R |
| 3,493,210 | 2/1970 | Brenner | 248/361 R |

Primary Examiner—Chancellor E. Harris
Attorney—Glenn Orlob, Kenneth W. Thomas and Bernard A. Donahue

[57] ABSTRACT

A mechanism which will allow passage of an object approaching the mechanism from a first direction but will prevent passage of an object approaching from the opposite direction. A lip member is mounted on a spring biased carrier beam which is pivotally supported on the base of the mechanism and held by releasable holding means in position to extend the lip member into the path of the object. An object which impacts the lip member from the first direction will cause the lip member to actuate a release means to allow rotation of the carrier beam away from the object. The spring biasing of the carrier beam maintains the lip member in contact with the near surface of the object, and causes the lip to return to its original position when the object moves past the mechanism. Impact loads imparted to the lip member from the opposite direction are rigidly resisted by the lip member, the carrier beam member and the holding means. The preferred embodiment involves an aircraft cargo deck mechanism which is specifically designed to be installed in a limited space envelope near the cargo door to allow movement of cargo into the aircraft but to prevent inadvertent movement back through the door. Other features of the preferred embodiment include a self-locking tiedown clamp, and a manually actuated lever for releasing the clamp and for locking the mechanism in an inoperative position below the level of the deck during unloading operations.

11 Claims, 11 Drawing Figures

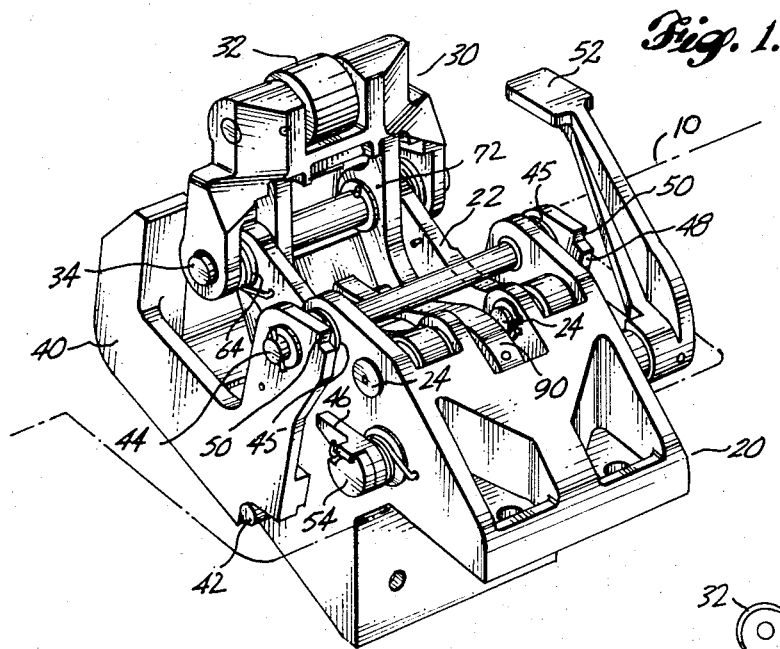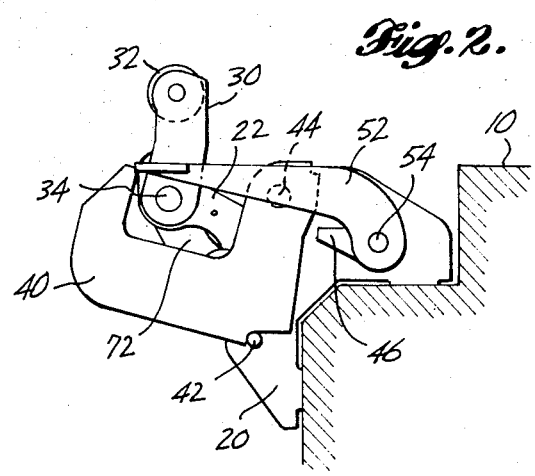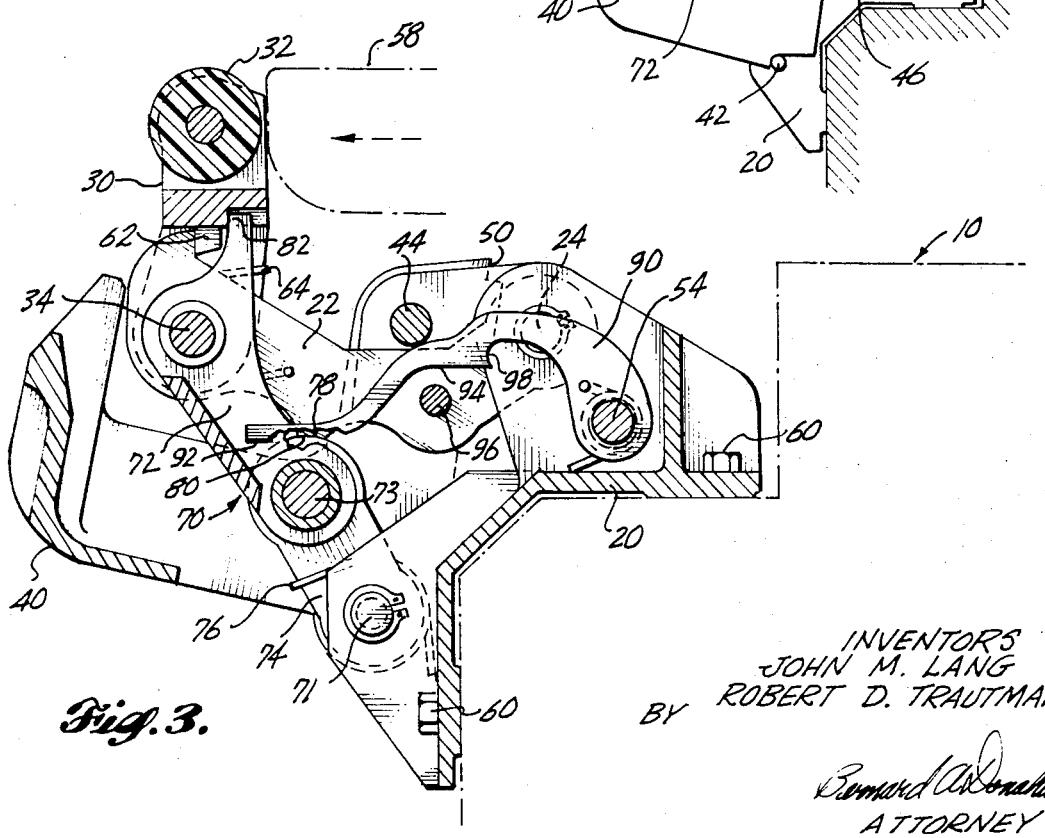

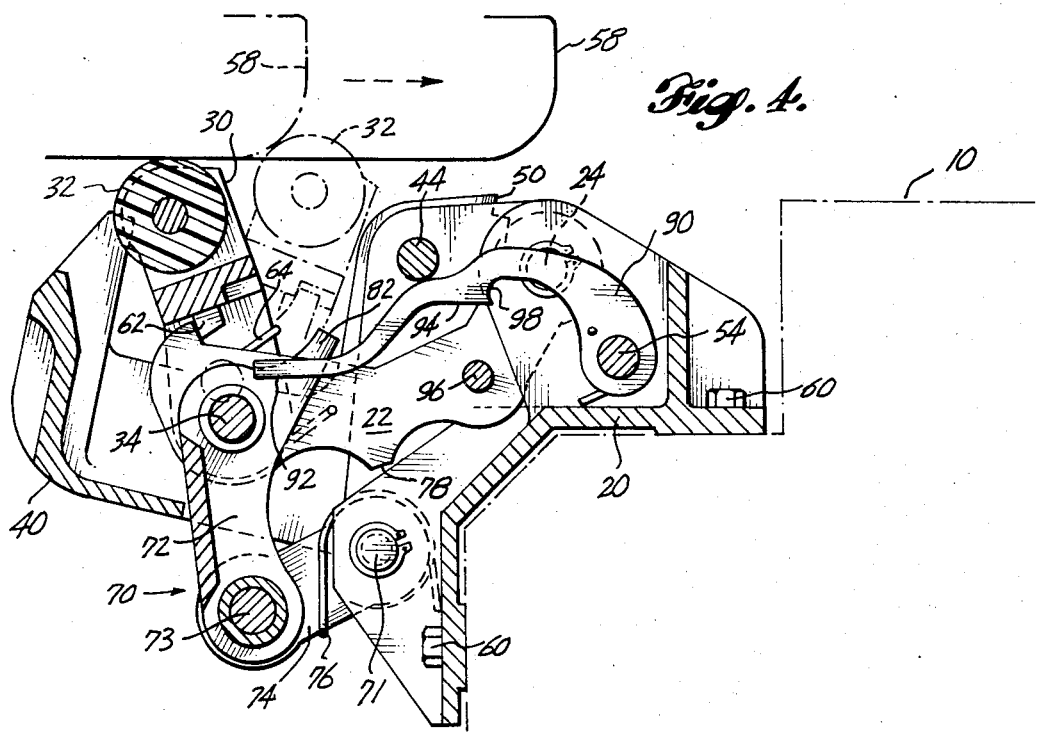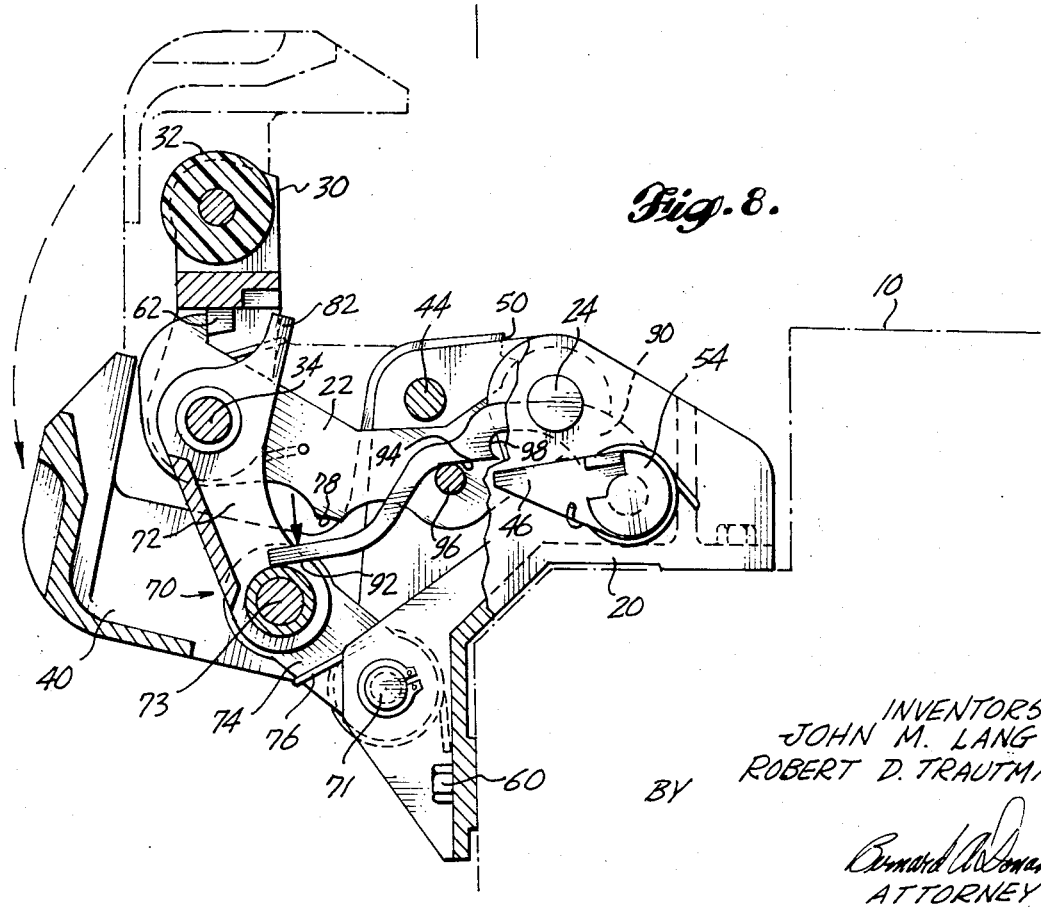

PATENTED OCT 17 1972

INVENTORS
JOHN M. LANG
ROBERT D. TRAUTMAN
BY
Bernard W. Donahue
ATTORNEY

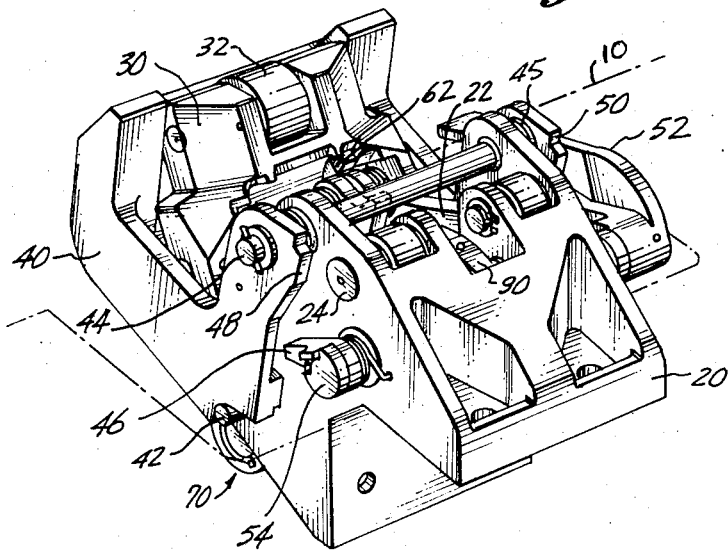
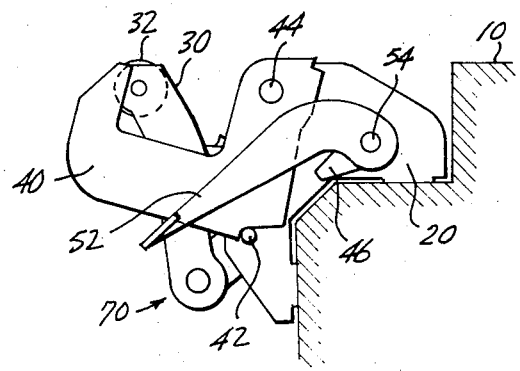
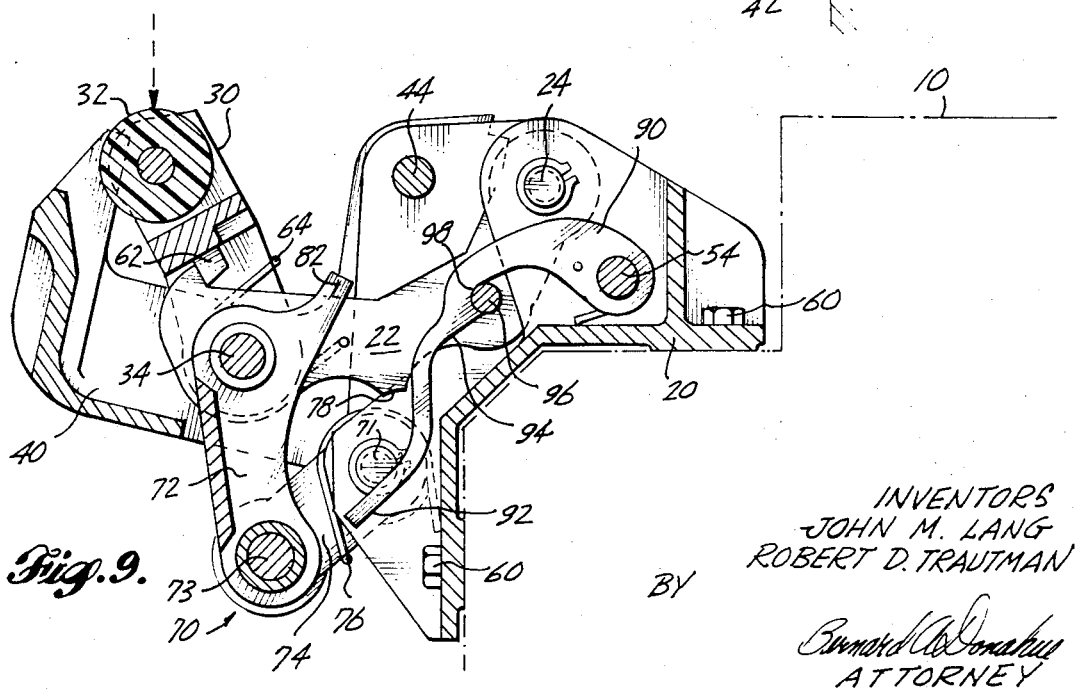

SEMI-AUTOMATIC RESTRAINT MECHANISM

FIELD OF THE INVENTION

This invention relates to a mechanism which will allow movement of an object approaching from a first direction but will prevent movement of an object approaching from a direction opposite to said first direction; and, more particularly, to a deck mounted aircraft cargo handling mechanism which allows movement of cargo containers in a first direction into position in the aircraft but prevents inadvertent movement of containers in an opposite direction and incorporates tiedown, retraction, and release features.

BACKGROUND OF THE INVENTION

In modern cargo carrying aircraft, it is desirable to reduce the time required for loading and unloading cargo containers to an absolute minimum. Accordingly, sophisticated deck mounted ball bearing transfer panels and power roller mechanisms have been designed to assist in the orderly automatic, or semi-automatic, flow of cargo onto the cargo deck and into a final stowed position. The cargo is normally packaged in specially designed containers or pallets which are shaped to utilize all available space within the cargo compartment of the aircraft.

During loading operations, the aircraft cargo deck may not be precisely level. Therefore, in the past it has been necessary for the crew to exercise care during the loading process to assure that an unattended container does not slide, or roll, back through the door opening with catastrophic results. Also, when a container has been moved along a predetermined path to its destination within the cargo compartment, it is necessary to restrain movement of the container with respect to the deck by means of tiedown mechanisms, to prevent excessive movement during flight conditions. Such tiedown mechanisms are preferably quickly engaged by simple and reliable manual actuation means. It is desirable that any deck-mounted mechanisms incorporate features for rapidly disconnecting, and then retracting, the mechanism beneath the surface of the floor, to allow unrestricted passage of containers over the deck and out of the cargo compartment.

OBJECTS OF THE INVENTION

A primary object of this invention is to provide a mechanism which can function in a very limited space envelope to allow passage of an object approaching the mechanism from a first direction but prevents movement of an object approaching from a direction opposite to said first direction.

A related primary object of this invention is to provide a mechanism to be mounted in the deck of an aircraft cargo compartment within a narrow space envelope between the deck and the entrance door to allow movement of cargo containers in a first direction into the aircraft but to prevent horizontal movement of such containers in an opposite direction during the loading process and during flight conditions.

A further related object of this invention is to provide a mechanism, suitable for mounting anywhere in an aircraft cargo deck, which allows motion of cargo containers in a first direction but which prevents motion in an opposite direction and thereby inherently provides one element of a guidance means to assist in moving containers along a predetermined path to their destination within the cargo compartment.

A further object is to provide, in a mechanism of the type described, a tiedown clamp which can be rapidly locked into position to restrain movement of a container during flight conditions, and which can be rapidly unlocked by manual means during unloading operations.

A further object of this invention is to provide, in mechanisms of this type, manually operated means for rapidly retracting, and then locking the entire mechanism beneath the surface of the deck to clear the deck during unloading operations.

SUMMARY

The above objects of the invention have each been achieved in the mechanism of the disclosed preferred embodiment in which a carrier beam member is pivotally mounted with respect to a base attached to an aircraft cargo deck. The carrier member carries a lip member which extends outwardly into the path of a container approaching the mechanism. When a container contacts the lip member from the direction in which passage is to be prevented, the lip member will rigidly transfer the resulting loads through stop means into the carrier member. The pivotally mounted carrier member is prevented from rotating by holding means which in the preferred embodiment comprise a spring biased overcenter toggle linkage. When a container contacts the lip member from the direction in which passage is to be permitted, the lip member moves to forcibly actuate a release means which disconnects the holding means, thereby allowing rotary movement of the carrier beam away from the object passing over the mechanism. The carrier beam is spring biased to urge the lip member upwardly to maintain contact with the lower surface of the container as it passes above the mechanism, and to return the lip member to its original position when the container has passed over the mechanism. A tiedown clamp is pivotally mounted on the base for manual rotation upwardly to a locked position for restraining movement of the container. The clamp is released by a manually actuated lever and is returned to its stowed position by a torsion spring. Continued movement of the lever past the clamp release position will rotate the carrier beam downwardly to lock it in an inoperative position wherein the entire mechanism is retracted beneath the deck. The mechanism may be released from the inoperative position and returned to its operative position by application of downward acting manual force on the free end of the lip member.

BRIEF DESCRIPTION OF THE DRAWINGS

FIG. 1 is a perspective view of the mechanism of this invention installed at an edge of a cargo deck and deployed in an operative position.

FIG. 2 is a schematic side elevation view of the mechanism, deployed as in FIG. 1.

FIG. 3 is an expanded cross-section view of the mechanism deployed as in FIGS. 1 and 2, showing details of construction of the elements of the mechanism.

FIG. 4 is a cross-section view similar to FIG. 3, showing the elements positioned by the action of a container passing above the mechanism.

FIG. 8 is a cross-section view showing the elements initially positioned for manually releasing the tiedown clamp and retracting the mechanism.

FIG. 9 is a cross-section view showing the elements of the mechanism locked below the deck in the fully retracted position.

FIG. 10 is a schematic side elevation view similar to FIG. 9.

FIG. 11 is a perspective view showing the elements positioned as in FIG. 9.

DESCRIPTION OF THE PREFERRED EMBODIMENTS

Figure 7:
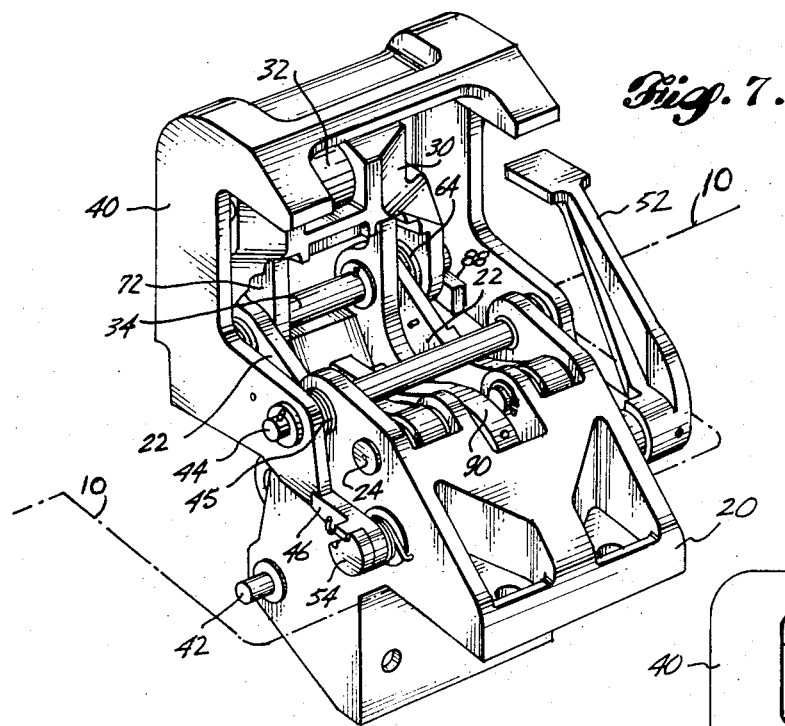
FIG. 7 is a perspective view showing the tiedown clamp positioned as in FIGS. 5 and 6.

FIG. 1 is a perspective view of the mechanism, which may be installed, for example, just inside an aircraft cargo door along the edge of the cargo deck. The deck is schematically represented by the lines 10. It is contemplated that several mechanisms will be used for each door. In such installations the space envelope available between the edge of the deck and the door is very narrow, thereby severely restricting the degree of movement of the elements of a mechanism of this type. A base 20 is appropriately designed for attachment to the deck structure. A pair of carrier beam members 22 are pivotally mounted on the base by pins 24 which are supported between clevis elements of the base 20. A lip member 30 includes an antifriction roller 32 and is pivotally mounted by pin 34 on the carrier beam members 22. A tiedown clamp 40 is shown in its stowed or inoperative position against stops 42, and is pivotally mounted by pin 44 for manual rotation upwardly toward its operative position where a spring biased pawl 46, initially depressed by clamp cam surface 48, will snap into locking engagement with a detent recess 50 in the clamp 40. A pedal or lever 52 is rigidly affixed to a shaft 54 extending through the base 20 and may be manually rotated downwardly to release pawl 46 from detent 50 to lower clamp 40. As will become more apparent in subsequent FIGURES, continued rotation of lever 52 serves to retract and lock the entire mechanism below the level of the deck.

FIG. 2 is a simplified schematic side elevation view showing the locations of the major elements when the mechanism is preset in an operative position. The lip member 30 is disposed in an upright position in the path of containers moving over the deck. Other elements of the mechanism such as base 20, clamp 40, and carrier beam member 22, can be seen to be positioned below the level of deck 10.

FIG. 3 is an expanded cross-section showing details of the internal construction of the mechanism with the elements positioned to restrain movement of a container 58 in an outboard direction. The base 20 is rigidly secured in a recessed portion of deck 10 by bolts 60. The carrier beam members 22 are pivotally mounted on base 20 by the pins 24. The lip member 30 is located in an upstanding limit position against stop means 62 which includes abutting surfaces on lip member 30 and carrier beam 22. A torsion spring 64, acting between the lip member 30 and the carrier beam member 22, functions to retain the lip in the upstanding limit position established by stop means 62. Means for holding the carrier beam member 22 in the position shown is provided by an overcenter toggle mechanism 70 which extends between pin 34 and a pin 71 located on base 20. As shown in FIG. 3, upper toggle link 72 is connected by pin 34 to carrier beam member 22 and by pin 73 to lower toggle link 74. The link 74 is connected at its opposite end to pin 71, on base 20. A torsion spring 76, acting between base 20 and link 74 urges the toggle mechanism 70 in a clockwise direction as shown, just past a dead center position wherein an upper surface 78 of link 74 contacts a stop means surface 80 on carrier beam 22. It will be apparent that when an outboard acting load is encountered, such as would be generated by the container 58 tending to move to the left as shown, the load on lip member 30 will be reacted by the stop means 62 and the pivot pin 34 into the carrier beam member 22, and that downward rotation of carrier beam 22 will be prevented by the toggle mechanism 70 positioned as shown. Therefore, the mechanism serves as a horizontal restraint for a container which is to be stowed for flight conditions. Also, when several such mechanisms are located in an aligned relationship in the cargo compartment they will serve as a guide system for movement of containers along a predetermined path. When a container approaches the mechanism by moving to the right into the cargo compartment, the container will impact the roller 32, and rotate the lip member 30 clockwise as shown to separate the stop means 62. The roller 32 will move to the right and downwardly about pivot 34 against the action of the torsion spring 64. As is shown more clearly in the dotted line positions of FIG. 4, the lip member 30 will apply a force to lug 82 of upper toggle link 72 which tends to rotate the toggle mechanism 70 from the overcenter position shown in FIG. 3, past dead center to an opposite overcenter position to thereby provide means for releasing carrier beam member 22 so that it may rotate away from the container 58 under the action of forces imposed on lip member 30.

In FIG. 4, the dotted lines show the lip member 30 rotated to the right from the FIG. 3 position, with roller 32 engaged against the corner radius of the oncoming cargo container 58. The lip member 30 forcibly rotates upper pawl 72 by forces applied to the lug 82 to break the overcenter toggle mechanism 70 and collapse it in scissors-like fashion to the position shown. As the lip member 30 and roller 32 move from the dotted line position downwardly under the bottom of container 58, the torsion spring 64 will automatically serve to snap the lip member back to the solid line position shown. To reliably perform this function the torsion spring 64 must be sized to overcome any friction loads involved and to provide enough force to slightly depress the toggle mechanism 70 which is spring biased upwardly by the lower torsion spring 76. This function of snapping the lip member 30 back in the direction of approach of the container 58 is highly important in order to place the lip in a position to raise behind the trailing edge of the container as soon as the trailing edge reaches the mechanism. Torsion spring 76 will maintain roller 32 in contact with the bottom of container 58 and when the container has passed over the roller 32, the torsion spring 76 will cause the carrier beam 22, and hence lip member 30, to immediately snap back to the FIG. 3 position to prevent any movement of the container in a reverse direction.

Figure 5:
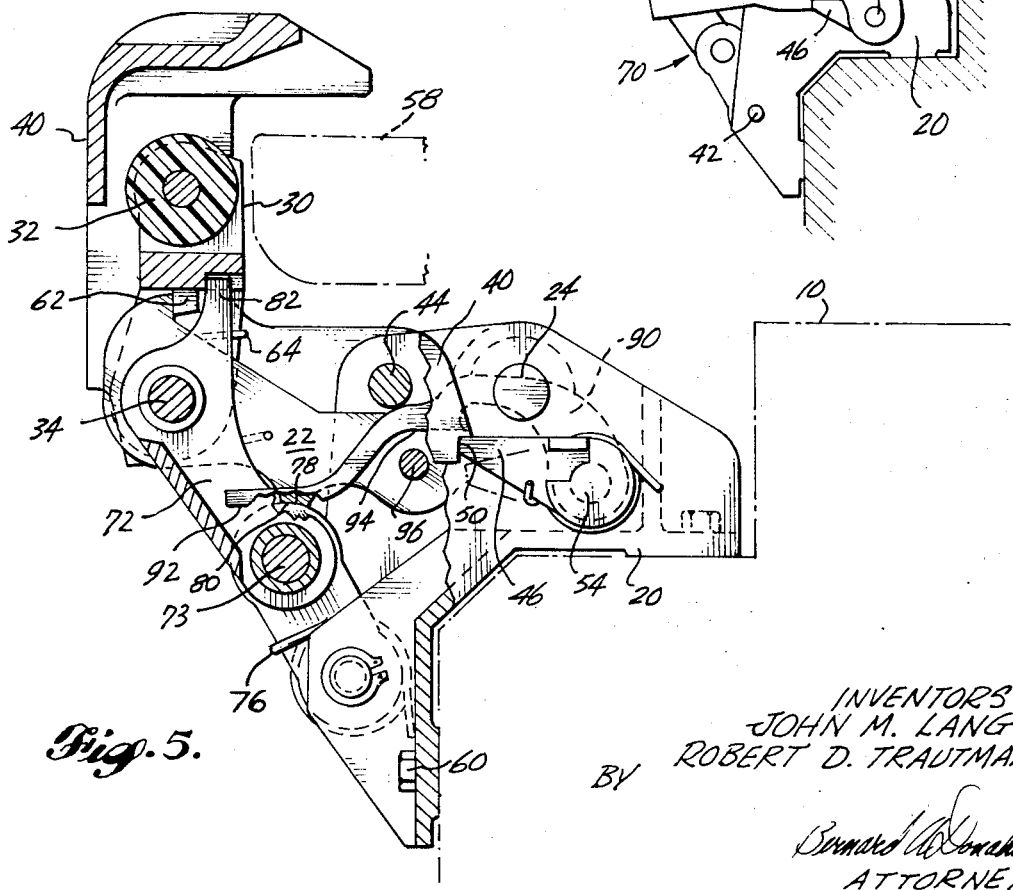
FIG. 5 is similar to FIG. 4, showing the elements returned to their initial positions after the container has passed over the mechanism, and the tiedown clamp locked in place to restrain vertical movement of the container.

FIG. 5 shows the elements returned to their upper limits of travel by torsion spring 76 after the container 58 has passed over roller 32. In this position the mechanism optionally serves either as a temporary horizontal restraint against reverse movement of the container, as a guide member for moving the container transversely to its oncoming direction of travel, or as a permanent horizontal restraint for a container which is to be stowed above the mechanism for flight. When a container is to be stowed, the tiedown clamp 40 will be manually rotated upwardly until pawl 46 engages in detent 50, thereby locking the clamp in position to restrain vertical movement of the container 58. Since lip member 30 provides restraint against horizontal movement and clamp 40 restrains vertical movement, the container is now secured with respect to the mechanism for flight conditions.

Figure 6:
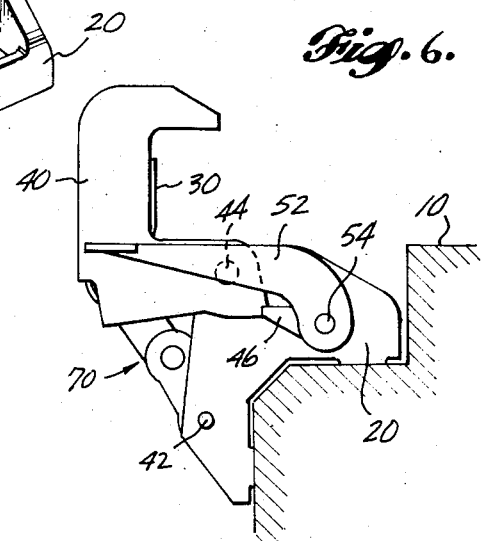
FIG. 6 is a schematic side elevation view similar to FIG. 5.

FIG. 6 is a schematic side elevation view and FIG. 7 a perspective view of the major elements of the mechanism in the flight restraint positions just discussed. The lever 52 is disposed horizontally and the lip member 30 and clamp 40 locked in an upright vertical position. In FIG. 7 it may be observed that the right hand end of pin 34 is nearly engaged with a lug 88 on the inside of clamp 40. The lug is provided to prevent inadvertent movement of clamp 40 to the upright position for flight when carrier beam 20 (and hence pin 34) is depressed. This lug will prevent erection of the clamp when the lip member 30 is depressed and unable to react horizontal loads from the container.

FIG. 8 illustrates the position of the elements when it is desired to retract the clamp 40 from its upward locked position by downward rotation of lever 52. Initial downward movement of lever 52 will rotate shaft 54 and move pawl 46 out of detent 50 in clamp 40. The clamp will then snap back to its stowed position under the action of a torsion spring located at pivot 44. A lever-like cam 90 is rigidly affixed to shaft 54. Further rotation of shaft 54, by means of manual lever 52, provides a means for retracting the entire mechanism and locking it below the surface of the deck for expeditious removal of cargo from the aircraft. A cam 90 is rigidly attached to lever 52 on shaft 54 and is shaped at outer surface 92 to engage the toggle mechanism center pin 73 and move it outwardly to break past the overcenter position and release the carrier beam member 22 from its holding means. When the toggle mechanism is past center and begins to scissor, an intermediate surface 94 of cam 90 will engage pin 96 which is affixed to, and extends between, carrier beam members 22. Thus, further rotation of lever 52 will cause the carrier beam member 22 to rotate downwardly until the pin 96 engages and locks in detent 98 of cam 90, as shown in FIG. 9.

FIGS. 9, 10 and 11 show the elements of the mechanism fully retracted and locked below the surface of the deck to allow free movement of cargo containers over the deck for unloading purposes. The handle 52 is held downwardly as shown against a torsion spring at pivot 54 by the engagement of carrier beam pin 96 and cam detent 98. To release the mechanism from the retracted and locked position shown in FIGS. 9, 10 and 11, a manual force, as by the foot of a workman, is applied downwardly to lip member 30 at the roller 32. Such a force is shown in dotted lines in FIG. 9, and serves to rotate carrier beam member 22 further downwardly to release pin 96 from detent 98. A torsion spring acting on the cam 90 at 54 will then snap the cam 90 upwardly to a rest position against pin 44. The carrier beam 22 is then free to return to its upward limit position and will do so immediately under the action of lower torsion spring 76.

The invention has been described with reference to a preferred embodiment which was specifically designed for aircraft cargo handling systems. However, it is apparent that the mechanism concept disclosed herein may have widespread utility in other systems; for example, in the handling of packages or products by a conveyor system for warehouse or factory purposes. Also, it is apparent that many modifications to the preferred embodiment will occur to persons skilled in this art. Accordingly, the invention should be considered to be limited only by the scope of the appended claims.

What is claimed is:

1. A mechanism of the type described which will allow movement of an object approaching the mechanism from a first direction but will prevent movement of an object approaching the mechanism from a second direction opposite to said first direction comprising: a base adapted for attachment to supporting structure; a carrier member mounted on a pivot on said base member; a lip member rotatably mounted on said carrier member at a distance spaced apart from said pivot; stop means located on each of said carrier and lip members for establishing an upstanding limit position for said lip member and for preventing any rotary movement of said lip member past said upstanding limit position; spring means acting between said carrier and lip members and urging said lip member into said limit position; holding means for preventing rotary movement of said carrier member about said pivot; release means responsive to movement of said lip member for releasing said holding means when an object moving in said first direction comes into physical contact with said lip member, to thereby release said carrier member for rotary movement about said pivot on said base member; wherein when said mechanism is preset in an operative position, the mechanism will dispose said lip member in the path of objects moving past said mechanism; and wherein an object approaching from said first direction will impact and move said lip member away from said limit position, thereby actuating said release means to allow rotary movement of said carrier member and said lip member away from the path of said object; and wherein an object approaching from said second direction will be prevented from moving past said mechanism by reaction loads developed within said lip member, said stop means, said carrier member, said holding means, and said base.

2. A mechanism according to claim 1 which includes means for locking said mechanism in an inoperative position wherein said lip member is locked and held in a position which is out of the path of objects moving past said mechanism.

3. A mechanism according to claim 2 wherein, when said mechanism is locked in said inoperative position an axial force applied to the lip member will be effective to release said mechanism from said inoperative position and back into an operative position.

4. A mechanism according to claim 2 wherein said means for locking said mechanism includes a lever element pivotally mounted on said base and disposed in a position suitable for manual actuation, a cam element operably connected to said lever element and having a recessed detent, and a pin member connected to said carrier member and disposed for positive locking engagement in said detent surface when said lever member is rotated a predetermined amount.

5. A mechanism according to claim 1 wherein said holding means comprises an upper toggle link pivotally attached to said carrier member, and a lower toggle link pivotally attached at opposite ends thereof to said upper toggle link and said base member respectively, stop means to limit rotational movement of said toggle link, and spring means for urging said lower toggle link against said stop means.

6. A mechanism according to claim 5 wherein said lip member and said upper toggle link are provided with interengaging surfaces for rotation of said upper toggle link upon rotation of said lip member by an object moving in said first direction to thereby release said toggle mechanism and allow it to collapse to allow movement of said carrier beam.

7. A mechanism according to claim 1 which additionally includes a tiedown clamp pivotally mounted on said base member, and pawl and detent means actuatable by rotation of said tiedown clamp for locking said tiedown clamp in position to react vertical loads from an object stowed in close proximity to said mechanism.

8. A mechanism according to claim 7 which includes a lever member pivotally mounted on said base and wherein said pawl and detent means are released by rotation of said lever member.

9. A mechanism according to claim 5 wherein said lever element is provided with a surface for engagement with the pivot connection between said upper and lower toggle members to displace the pivot past a center position defined by a line between the pivotal attachments of said toggle members to said base and to said carrier members to thereby collapse said toggle mechanism.

10. A mechanism according to claim 9 which includes a pin attached to said carrier member and wherein said cam is provided with a second surface for engagement with said pin to rotate said carrier member about said first pivot.

11. A mechanism according to claim 1 wherein said lip member is provided with a roller arranged to extend beyond said lip member to provide a rolling contact with objects approaching said mechanism from said first direction.

* * * * *